Figure 1:
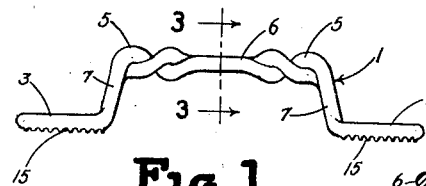

Sept. 7, 1943.　　　J. W. SIMMONS　　　2,328,587
RESILIENT FASTENER
Filed March 18, 1942　　　2 Sheets-Sheet 1

INVENTOR.
BY John W. Simmons
Hull & West, ATTYS.

Sept. 7, 1943. J. W. SIMMONS 2,328,587
RESILIENT FASTENER
Filed March 18, 1942 2 Sheets-Sheet 2

INVENTOR.
BY John W. Simmons
Hull & West, ATTYS.

Patented Sept. 7, 1943

2,328,587

UNITED STATES PATENT OFFICE 2,328,587

RESILIENT FASTENER

John W. Simmons, Cleveland Heights, Ohio

Application March 18, 1942, Serial No. 435,215

10 Claims. (Cl. 85—36)

This invention relates to improvements in fasteners of the class popularly known as "speed nuts."

The principal characteristic of my improved fastener resides in the fact that it is constructed of resilient metal wire. Being drawn from ductile metal, wire possesses certain inherent characteristics that are responsible for the attainment of many objects of the invention, among which are initial and indefinitely prolonged effectiveness of the fastener; adaptability of the material to fabrication without its original strength being impaired or its fibrous or molecular structure being destroyed; ease and economy of manufacture, and simplicity and cheapness of the product.

The resilient metal wire from which the fastener is made may be ferrous, non-ferrous or any alloy thereof. To the best of my knowledge, all so-called "speed nuts" of prevailing types have been constructed of ferrous material because the nature of their construction and the principle upon which they function make the use of non-ferrous metal impracticable. As a consequence, the former types of spring fasteners are not suitable for use with soft material, such as brass, copper, or aluminum. When such material is threaded, the threads are shallow; and when a fastener of said former kind is pressed over the threaded element it damages or strips the threads thereby nullifying the effectiveness of the fastener. Because non-ferrous material in the form of wire can be tempered or drawn to any degree of hardness or resiliency desired, my invention opens up an entirely new field of application of spring fasteners as, for example, the radio field where the use of ferrous material is avoided as far as possible for reasons well known to those familiar with radio practice.

Additional objects of my invention are the production of a spring wire fastener that is adapted for use with threaded or unthreaded entering elements, such as threaded bolts or screws, or plain studs or lugs of different cross section; the production of a spring wire fastener that can be made compact and of various shapes so as to adapt it to restricted spaces and conditions where sheet metal devices of the same class are disqualified by their size and shape made necessary by their structural character; to provide a resilient wire construction that is peculiarly suited to multiple spring fasteners or so-called "gang nuts" of the class in question; to provide a multiple spring fastener that is especially convenient of adjustment to the different spacing and arrangement of grouped entering elements; the production of a spring wire fastener that is not liable to be rendered ineffective if compressed further than intended in the application of it to an entering element, in contradistinction to former spring fasteners made of sheet metal and which are liable to permanent distortion when forced over an entering element and compressed beyond a given point and, as a consequence, exert no gripping or biting action upon the entering element and/or a binding action between the parts that are joined together by the entering element.

Advantages additional to those already mentioned arising from the use of wire for my purpose are that the teeth for engagement with the entering element may be swaged, drawn, or otherwise formed to fit the profiles or contours of fine or coarse threads of different types or classes; that a wide range of sizes and styles of teeth may be formed from a wire of given cross sectional size and shape; and that the individual teeth may be disposed in a plane normal to the axis of the entering element, or inclined with respect thereto in accordance, or approximately in accordance, with the pitch of the thread to be engaged thereby.

Further advantages resulting from the character or construction of my improved spring wire fastener are low initial tool and die expense, and low cost of upkeep or repair of the tools or dies, as compared with the expense of producing and maintaining dies used in the manufacture of sheet metal fasteners.

Figure 2:
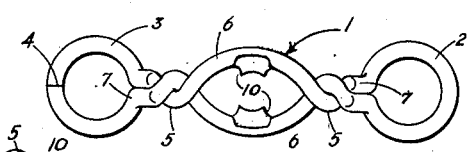
Figure 3:
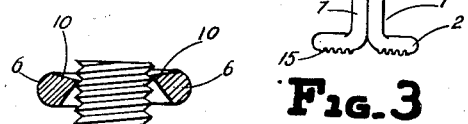
Figure 4:
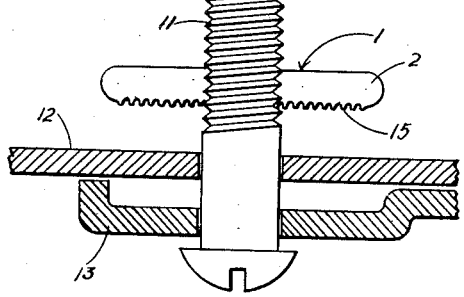
Figure 5:
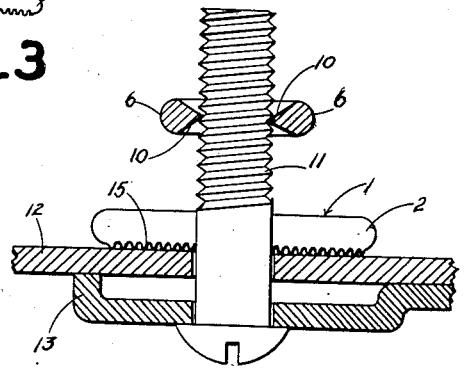
Figure 6:
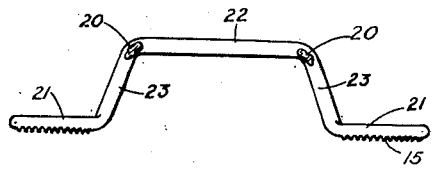
Figure 7:
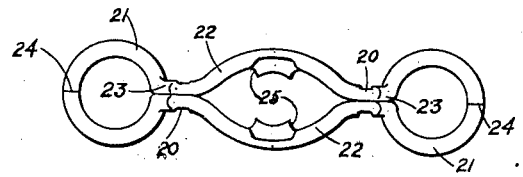
Figure 8:
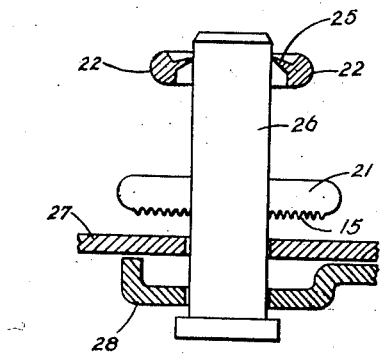
Figure 9:
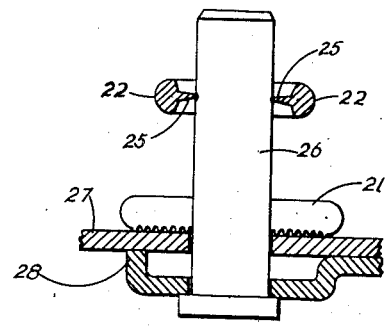
Figure 10:
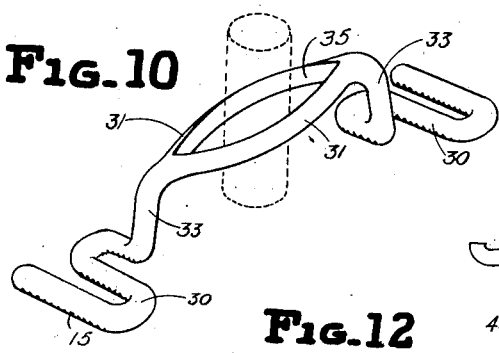
Figure 11:
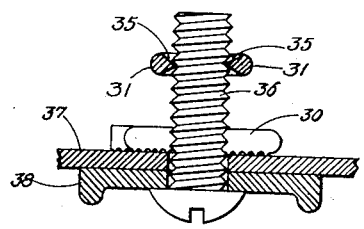
Figure 12:
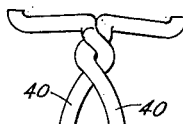
Figure 16:
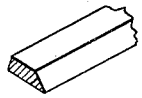
Figure 17:
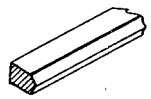
Figure 14:
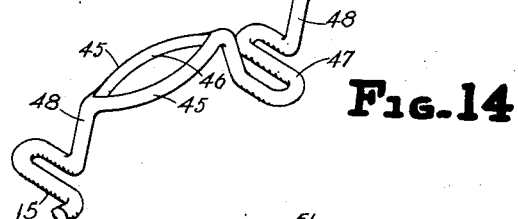
Figure 18:
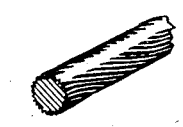
Figure 15:
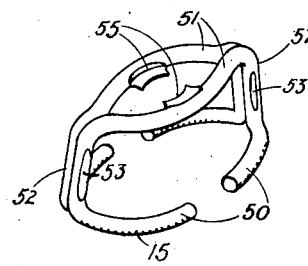

The foregoing objects and advantages, with others hereinafter appearing, are attained in the forms of my invention illustrated in the accompanying drawings wherein Fig. 1 is a side elevational view and Fig. 2 is a plan view of one form of my improved spring fastener; Fig. 3 is a section on the line 3—3 of Fig. 1; Fig. 4 is a sectional detail showing, on a considerably larger scale, the fastener of the preceding views being applied to an entering element that is projected through apertures in two members that are to be bound together by means of the entering element and fastener; Fig. 5 is a view, similar to Fig. 4, showing said members bound together by the entering element and fastener and with the fastener in effective condition; Figs. 6 and 7 are a side elevational view and a plan view, respectively, of another form of the invention; Fig. 8 shows the present form of the fastener being applied to an unthreaded entering element for binding two members together; Fig. 9 is a view, similar to Fig. 8, showing the entering element and fastener in effective condition to bind the two members together; Fig. 10 is a perspective view showing a split-wire modification of the invention; Fig. 11 is a sectional detail showing the split-wire form of the spring fastener applied to a threaded element through which two members are fastened together; Fig. 12 is a plan view, and Fig. 13 a side elevational view of a multiple spring fastener constructed in accordance with the invention; Fig. 14 is a perspective view of a split-wire multiple fastener; Fig. 15 is a perspective view of a relatively short or compact fastener that, except for its base portion, is quite similar to the form of the invention illustrated in Figs. 6 to 9, although the major portion of the structure might follow other forms of the invention herein illustrated; Figs. 16 and 17 are examples of wires of different cross sections which may be employed in the production of various forms of my improved spring wire fastener, and Fig. 18 is a fragmentary perspective view of a knurled or corrugated wire from which the fastener may be made.

According to Figs. 1 to 5, the fastener, designated generally by the reference numeral 1, is formed from a single piece of wire, although two pieces may be employed, as will hereinafter appear, should such a construction be found advantageous to production according to the manufacturing method selected. As shown, however, the single piece of wire is curved back upon itself at its longitudinal center to provide a ring-like base or bearing portion 2 at one terminal of the fastener and, at the other, the ends of the wire are brought together in such manner as to form a similar base or bearing portion 3, the ends of the wire being abutted and, if desired, welded, at 4. The portions of the wire intermediate the bases or bearing portions 2 and 3 are twisted about each other with either a right hand or left hand twist, or right at one end and left at the other, in the regions designated 5, so as to leave therebetween parts that are spread apart to provide opposed jaws 6, the general plane of which is desirably parallel to and spaced a suitable distance from the plane of the bases or bearing portions 2 and 3. Risers 7 connect the bases or bearing portions with the central part of the fastener. Formed by swaging, forging, or a pinching operation, on the inner sides of the jaws 6 are teeth 10 that are intended for holding engagement with the entering element 11 when the fastener 1 is forced thereover, as illustrated in Figs. 4 and 5.

In Fig. 4, the fastener is shown as being forced over the threaded entering element 11, which element, in the form of a headed bolt or screw, is engaged through aligned apertures in members 12 and 13. In the act of applying the fastener to the entering element, the teeth 10 ratchet over the threads of the entering element, so to speak, and such action tends to spring the jaws 6 outwardly and at the same time twist the wire whereof they are formed. In any suitable manner, preferably by means of a tool, the fastener is forced home over the entering element so that, through the latter, the members 12 and 13 are firmly bound together, such condition of the parts being illustrated in Fig. 5 where the bases or bearing portions of the fastener are shown in firm contact with the member 12. As will presently more fully appear, wires of different cross-sectional shape may be used, but regardless of shape, they may be either smooth, as shown in all views of the fabricated fasteners, or corrugated, roughened or knurled, as indicated in the detail view of Fig. 18. When smooth wire is used, the faces of the bearing portions or bases that engage the member may, if desired, be serrated, knurled or corrugated, as indicated at 15, this feature being shown as incorporated in all forms of the invention appearing in the drawings. The purpose of providing a roughened bearing surface for the bases is to more effectively hold the fastener against turning when used with a threaded entering element, such as a bolt or screw, and said element is turned for the purpose of drawing the fastener home and placing it under compression thereby to insure the parts being firmly bound together against loosening from shock or vibration. It is customary, in the use of spring fasteners with threaded entering elements, to turn the elements at the conclusion of the operation for the purpose stated. When the fastener at present under consideration is in compressed condition, as stated, the jaws 6 are under tension in a direction laterally of the entering element and under torsion by reason of the engagement of the teeth 10 with the threads of the entering element. In the case of an unthreaded entering element, the compression of the fastener is accomplished by the direct application of force thereto, as by means of a tool.

In the form of the invention illustrated in Figs. 6 to 9, the fastener is constructed of two pieces of wire, preferably of identical shape, reversely arranged, and connected together, desirably by welding as indicated at 20, to provide bearing portions or bases 21 and jaws 22, the plane of the latter, as in the former case, being spaced from the plane of the bases by risers 23. Where the ends of the pieces of wire abut each other, as shown at 24, they may or may not be welded together, as desired. The jaws 22 are provided with teeth 25. This same two-piece construction may be employed in the form of the invention illustrated in Figs. 1 to 5, the pieces being held together by twisting.

While the present form of the fastener may be employed with either threaded or smooth entering elements, it is shown as being applied to one of the latter kind in Fig. 8 where the entering element, shown as a headed stud, is designated 26 and serves the purpose of connecting together two members 27 and 28. In this case, the parts may be placed under compression by imposing due force upon the head of the entering element and the remote end of the fastener.

According to the embodiment of the invention illustrated in Figs. 10 and 11, the fastener is constructed of a single piece of wire that is formed at its ends to provide bearing portions or bases 30 and is split lengthwise throughout its middle region to provide jaws 31 that are spread apart for the reception between them of an entering element. The plane of the jaws is shown as spaced from that of the bases 30 by risers 33. The inner sides of the jaws 31 are given a shape to provide teeth 35. In Fig. 11 the present fastener is shown as applied to a threaded bolt or screw 36 which, in conjunction with the fastener, bind together the members 37 and 38.

Figure 13:
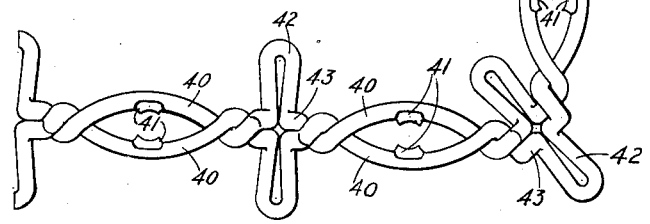

Figs. 12 and 13 illustrate a multiple fastener which is made by twisting two wires together at intervals to provide pairs of opposed jaws 40, having teeth 41 formed on their inner sides, and laterally extending loops 42 between adjacent pairs of jaws. These loops constitute bases or bearing portions that are desirably in a plane spaced from that of the jaws by risers 43. The unit from which these multiple fasteners or so-called "gang nuts" are made may be produced in any convenient length and cut up into structures of the required number of pairs of jaws and bases to suit the requirements of particular installations. The multiple fastener may be bent to dispose the pairs of jaws in any arrangement corresponding to that of a group of entering elements wherewith said fastener is to be used; and the fastener is susceptible to a further adjustment for properly spacing the pairs of jaws apart in accordance with the spacing apart of the entering elements, as by more or less straightening out the risers 43, it being understood that there is no definite spacing required between the plane of the jaws and that of the bases. This applies as well to single fasteners. In fact, in some adaptations of the invention the spacing of the plane of the jaws from that of the bases may be discarded under which circumstances the effectiveness of the fastener is dependent upon the tension of the jaws in a lateral direction plus, in some if not all cases, the reverse torque action.

A multiple fastener incorporating the split wire principle is illustrated in Fig. 14, where the pairs of jaws 45, formed to provide teeth 46, alternate with bearing portions or bases 47 from the plane of which said jaws are spaced by the risers 48. In this case the bases 47 lend themselves to adjustment in several ways, as longitudinally of the structure, or laterally to shift the adjacent pairs of jaws out of alignment with each other, or angularly as in turning a corner. Here, also, the risers may be straightened out more or less to effect the desired spacing of the pairs of jaws.

In any single or multiple fastener embodiment of the invention, the structure constituting the same may, if desired, be attached to one of the members wherewith the fastener is to be used, as by welding, or by means of rivets, bolts, screws, lugs or other types of fastening means. Such installations are desirable where the fasteners are disposed on the sides of panels or other structural members in inaccessible positions or beyond convenient reach of the person inserting the entering element.

In Fig. 15 I have shown inwardly directed bases 50 that are spaced from the plane of the opposed jaws 51 by risers 52. The two wires from which the fastener is constructed, and which are of identical form, are shown as connected together in the region of the risers 52 by welding, as indicated at 53. The jaws 51 are provided with teeth 55. By disposing the bearing portions or bases as shown, the device is rendered compact and may be used in more restricted places than can the other illustrated modifications; and it will be understood that, so far as the remaining parts of the device are concerned, they may follow any of the forms disclosed. Obviously, this contracted base feature is applicable to the split wire modification, as well as to the other forms shown.

The term "wire," as employed in the specification and claims, is intended to embrace any elongated element of ductile material having a suitable cross-sectional size and shape, examples of which are shown in Figs. 16 and 17, as well as in the previous views where the cross-section is circular; and the term "tooth" or "teeth" refers to the edge portions of the jaws that contact the entering element, whether constituted of parts of the wire as originally made, or of parts that have been swaged, pinched or otherwise formed from the body of the wire.

The invention is not to be confused with that class of devices in which threads, either male or female, consist of wire spirals or helixes, and wherein the convolutions entirely and more or less closely surround the element and advance axially thereof in accordance with the pitch of a screw.

Having thus described my invention, what I claim is:

1. A fastener of the class described comprising opposed jaws of resilient wire, said jaws being provided with inwardly directed teeth for engagement with an entering element insertable between said jaws, the teeth on opposed jaws being normally spaced apart a distance less than the thickness of such entering element, the ends of the jaws being united and said fastener also being provided with bases located beyond the point at which the jaws are so united.

2. In the fastener set forth in claim 1, risers extending between the ends of the jaws and the respective bases and supporting the jaws from said bases.

3. A fastener of the class described constructed of resilient wire and comprising bases, and opposed jaws formed from parts of the wire intermediate of said bases, the jaws having inwardly directed teeth for engagement with an entering element insertable between said jaws, the teeth on the opposed jaws being normally spaced apart a distance less than the thickness of such entering element, and the aforesaid parts of the wire being united in regions intermediate of the ends of the jaws and the bases respectively adjacent thereto.

4. In the fastener set forth in claim 3, risers located intermediate of the ends of the jaws and said bases.

5. In the fastener set forth in claim 3, said parts of the wire being united by their being twisted together in said regions.

6. A multiple fastener constructed of resilient wire formed into a plurality of pairs of jaws, each pair having opposed teeth, the ends of each pair of said jaws being united and the portions of the wire intermediate of adjacent pairs of jaws being formed to provide bases.

7. In the multiple fastener set forth in claim 6, a riser intermediate of each base and the adjacent end of each contiguous pair of jaws.

8. A multiple fastener constructed of resilient wire formed into a plurality of pairs of jaws, each pair having opposed teeth, the ends of each pair of said jaws being united and the portions of the wire intermediate of adjacent pairs of jaws and beyond the pairs of jaws adjacent the ends of the fastener being formed to provide bases, and a riser intermediate of each base and the adjacent end of each contiguous pair of jaws.

9. A fastener constructed of a piece of resilient wire that is shaped at its ends to constitute bases and is split lengthwise a substantial distance approximately midway between its ends, the severed portions being spread apart and shaped to provide a pair of jaws having opposed teeth, the parts of the wire beyond said jaws in both directions therefrom remaining integral whereby the jaws are firmly united at their ends.

10. In the fastener set forth in claim 9, risers located intermediate of the ends of the jaws and said bases.

JOHN W. SIMMONS.